UNITED STATES PATENT OFFICE.

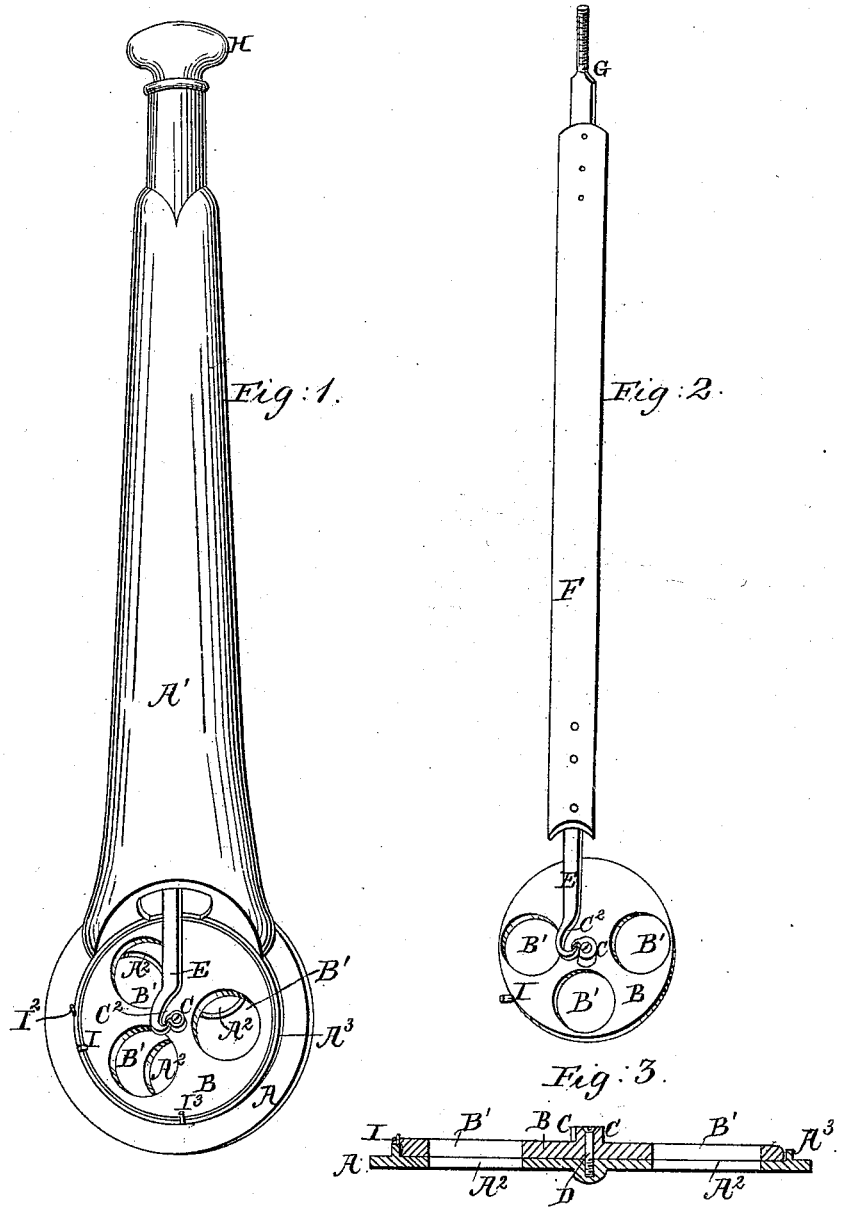

GEORGE CESSFORD, OF UTICA, NEW YORK, ASSIGNOR TO JOHN S. PECKHAM AND MERITT PECKHAM, OF SAME PLACE.

IMPROVEMENT IN STOVE-DAMPERS.

Specification forming part of Letters Patent No. 34,660, dated March 11, 1862.

*To all whom it may concern:*

Be it known that I, GEORGE CESSFORD, of the city of Utica, in the county of Oneida and State of New York, have invented a new and Improved Stove-Register; and I do hereby declare that the following is a full and exact description thereof, reference being had to the accompanying drawings, in which—

Figure 1 is a perspective view of the stove-register; Fig. 2, a perspective view of the damper, expansion-rod, and hub; and Fig. 3, a sectional view of the register-plate and damper through the hub.

A represents the register-plate; A', the extension thereof, covering and sustaining the expansion-rod.

B is the damper.

C is the hub; $C^2$, the hook or notch on the side thereof; D, the screw or pin.

E is the hook on the extension-rod, and F is said rod; G, the regulating-screw, and H the nut thereon.

$A^2$ $A^2$ $A^2$ are openings in the register-plate, and B' B' B' are corresponding openings in the damper.

I is a stop on B, and $I^2$ and $I^3$ are corresponding ones on A.

$A^3$ is a rim on the face of A, surrounding B.

The nature of my invention consists in uniting with a circular register somewhat similar to those in common use, but so made as to close of its own accord, an expansion-rod of metal, and connecting the same to the outer movable plate or damper near its center, by means of which the contraction and expansion of the expansion-rod opens and allows the damper to shut without the intervention of levers or other contrivances to gain power or motion.

The register-plate A may be in any desirable form, with a flat circular surface at the lower end, through which circular part, between the center and circumference, are two or more openings $A^2$ $A^2$ $A^2$. The extension of such plate may be like those in common use where an expansion-rod is used. The damper B is circular, having openings B' B' B' corresponding with those of the register-plate, and is attached to such plate A by a center pin or screw, around which it revolves. A rim $A^3$ $A^3$ projects from the face of A and surrounds B. The lower part of B is made heavier than the upper side, so that when left free to act it will always turn down, the openings in both plates being so arranged that when the lower side is down the damper is closed. In the center of B is the hub C, through the center of which the screw D passes, which screw serves to hold B in its place, and around which it revolves. On one side of C is the hook or notch $C^2$, into which the hook E of the expansion-rod fits. The two hooks must be so arranged that the point of draft of the hook E shall be but about the thirty-second part of an inch from the center for registers of ordinary-sized stoves. This is done by causing the point of draft to be placed below the center of the screw when the damper is closed. The expansion-rod may be made like those in common use or of any new and suitable form, of brass. On the lower end is attached the hook E, and on the other end is the screw, which passes through a hole in the top of the register-plate extension, and to which the nut H is screwed to regulate the damper.

The operation of the register is as follows: The weight of the lower side of B closes the draft. To open it, the nut H is turned until the stop I on B comes in contact with the stop $I^2$ on A, when the register is fully open; and when the heat of the stove has expanded the expansion-rod the weight of the lower side of B causes it gradually to turn down and gradually cover the said openings until the stop I comes in contact with $I^3$ on A, when the register is fully closed. As the stove now cools from lack of draft, the expansion-rod contracts and causes B to turn round again and the damper to open.

I claim—

The combination and arrangement of the register-plate A, the damper B, and the expansion-rod F, all constructed and operating substantially as described.

GEORGE CESSFORD.

Witnesses:
JOHN R. TIMAN,
WM. P. CARPENTER.